United States Patent
Tanno et al.

(10) Patent No.: US 9,686,224 B2
(45) Date of Patent: Jun. 20, 2017

(54) SOCIAL NETWORK REACTION REPORTING DEVICE, REPORTING METHOD, REPORTING PROGRAM, AND RECORDING MEDIUM

(71) Applicants: Takaaki Tanno, Shinagawa-ku (JP); Hideaki Usui, Shinagawa-ku (JP)

(72) Inventors: Takaaki Tanno, Shinagawa-ku (JP); Hideaki Usui, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 198 days.

(21) Appl. No.: 14/361,259

(22) PCT Filed: Dec. 27, 2012

(86) PCT No.: PCT/JP2012/083964
§ 371 (c)(1),
(2) Date: May 28, 2014

(87) PCT Pub. No.: WO2014/102986
PCT Pub. Date: Jul. 3, 2014

(65) Prior Publication Data
US 2015/0180819 A1  Jun. 25, 2015

(51) Int. Cl.
*G06F 3/048* (2013.01)
*H04L 12/58* (2006.01)
(Continued)

(52) U.S. Cl.
CPC .......... *H04L 51/32* (2013.01); *G06F 3/04842* (2013.01); *G06Q 10/107* (2013.01); *G06Q 30/02* (2013.01); *G06Q 50/01* (2013.01)

(58) Field of Classification Search
CPC ................ G06Q 50/01; G06Q 30/0269; G06F 17/30867
See application file for complete search history.

(56) References Cited

U.S. PATENT DOCUMENTS

| 8,639,767 | B1 * | 1/2014 | Harris ................ G06Q 50/01 709/202 |
| 2003/0063072 | A1 * | 4/2003 | Brandenberg ............ G01S 5/02 345/173 |
| 2011/0184886 | A1 * | 7/2011 | Shoham .............. G06Q 30/0283 705/400 |

(Continued)

FOREIGN PATENT DOCUMENTS

JP        2007-287131 A      11/2007

OTHER PUBLICATIONS

Baer, "Turn the Tables on Social Media with NutshellMail", http://www.convinceandconvert.com/social-media-strategy/turn-the-tables-on-social-media-with-nutshellmail/, Feb. 19, 2010.*

(Continued)

*Primary Examiner* — Jennifer To
*Assistant Examiner* — Joseph R Burwell
(74) *Attorney, Agent, or Firm* — Sughrue Mion, PLLC (57) ABSTRACT

A provision device (100) in a provision system providing a user conducting activities through a service with reactions of other users to the user is configured as follows. A presenter (101) presents a current state of the reactions from the other users to the user that have occurred while the user is conducting activities through the service to the user via the service while the user is conducting activities through the service. A notifier (102) gives notice of a summary of the reactions from the other users to the user that have occurred while the user is not conducting activities through the service to the user with no intervention of the service while the user is not conducting activities through the service. Then, as the user conducts a given operation on information contained in the notified summary, the notifier (102) prompts the user to start conducting activities through the service.

3 Claims, 10 Drawing Sheets

(51) Int. Cl.
    *G06Q 30/02*     (2012.01)
    *G06Q 10/10*     (2012.01)
    *G06Q 50/00*     (2012.01)
    *G06F 3/0484*     (2013.01)

(56) References Cited

U.S. PATENT DOCUMENTS

| | | | | |
|---|---|---|---|---|
| 2011/0258561 | A1* | 10/2011 | Ladouceur | G06Q 10/103 715/753 |
| 2011/0282955 | A1 | 11/2011 | Appelman et al. | |
| 2011/0307403 | A1* | 12/2011 | Rostampour | G06Q 50/265 705/325 |
| 2011/0314064 | A1 | 12/2011 | Jeyaseelan et al. | |
| 2012/0158843 | A1* | 6/2012 | Angani | G06Q 50/01 709/204 |
| 2013/0091229 | A1* | 4/2013 | Dunn | H04L 67/22 709/206 |
| 2013/0325755 | A1* | 12/2013 | Arquette | H04L 51/32 706/12 |
| 2014/0006977 | A1* | 1/2014 | Adams | H04L 51/32 715/758 |
| 2014/0280052 | A1* | 9/2014 | Alonso | G06Q 30/0201 707/722 |
| 2014/0282084 | A1* | 9/2014 | Murarka | H04L 51/32 715/752 |
| 2014/0297772 | A1* | 10/2014 | Loporto | H04L 51/32 709/206 |
| 2015/0081670 | A1* | 3/2015 | Ali | G06F 17/30991 707/722 |
| 2015/0212984 | A1* | 7/2015 | Bowden | G06F 17/30867 715/234 |
| 2015/0234806 | A1* | 8/2015 | Bhagwan | G06F 17/2765 705/7.18 |
| 2016/0234326 | A1* | 8/2016 | Camplejohn | G06F 17/30867 |

OTHER PUBLICATIONS

Burckhardt, "Customizing IBM Lotus Connections 3.0 email digests and notifications", IBM Inc., Mar. 2011.*

Fance, "Alternion—The Ultimate Social Media, Email, and Contacts Manager", http://www.bloggingtips.com/2011/05/28/alternion-ultimate-social-media-email-contacts-manager/, May 28, 2011.*

Laraki, "The best of Twitter in your inbox", https://blog.twitter.com/2012/the-best-of-twitter-in-your-inbox, May 14, 2012.*

Lifehacker, "NutshellMail Consolidates Social Network Alerts into Scheduled Emails", http://lifehacker.com/5155798/nutshellmail-consolidates-social-network-alerts-into-scheduled-emails, Feb. 18, 2009.*

Lifehacker, "NutshellMail Updates, Can Reply to Twitter by Email", http://lifehacker.com/5167734/nutshellmail-updates-can-reply-to-twitter-by-email, Mar. 10, 2009.*

NutshellMail, "About NutshellMail", archived at https://web.archive.org/web/20121028001211/https://nutshellmail.com/about, archived as of Oct. 28, 2012.*

NutshellMail, "NutshellMail Newsroom", https://nutshellmail.com/about/pressroom, Feb. 20, 2010.*

NutshellMail, "NutshellMail Launches First Social Networking Tool for the Mainstream", press release archived at https://web.archive.org/web/20100102163545/http://nutshellmail.com/news/press_releases/social_networking, Nov. 24, 2009.*

Profis, "Forget Twitter's (useless) weekly digest, check out News.me", http://www.cnet.com/how-to/forget-twitters-useless-weekly-digest-check-out-news-me/, May 16, 2012.*

Purdy, "How to Filter and Manage Your Online Social Life", http://lifehacker.com/5234590/how-to-filter-and-manage-your-online-social-life, May 1, 2009.*

Purdy, "NutshellMail Lets You Specify Which Facebook Messages Get Through", http://lifehacker.com/5424133/nutshellmail-lets-you-specify-which-facebook-messages-get-through, Dec. 11, 2009.*

Vasko, "NutshellMail: Tool for Coping with Information Overload", http://johnvasko.com/2009/12/05/nutshell-mail-tool-for-coping-with-information-overload/, Dec. 5, 2009.*

Fogg B. J. et al., "Online Persuasion in Facebook and Mixi: A Cross-Cultural Comparison," Stanford University, Jun. 4, 2008, pp. 35-46.

* cited by examiner

NOTIFICATION CONDITION TABLE 100a

| USER ID | NOTIFICATION COUNT UPPER LIMIT X | REACTION COUNT UPPER LIMIT Y |
|---------|----------------------------------|------------------------------|
| a       | 10                               | 8                            |
| b       | 5                                | 20                           |
| :       | :                                | :                            |

SOCIAL NETWORK REACTION REPORTING DEVICE, REPORTING METHOD, REPORTING PROGRAM, AND RECORDING MEDIUM

CROSS REFERENCE TO RELATED APPLICATIONS

This application is a National Stage of International Application No. PCT/JP2012/083964, filed Dec. 27, 2012, the contents of all of which are incorporated herein by reference in their entirety.

TECHNICAL FIELD

The present invention relates to a provision device, provision method, program, and recording medium, and particularly to provision of reactions of other users.

BACKGROUND ART

Recently, social networking services with which the users introduce their friends to each other to make new friends have been extensively used (for example, Patent Literature 1). With a social networking service, the users can post their diaries and/or pictures and release them to other users. Then, the other users can post their reactions such as comments on the diaries and/or pictures they viewed.

CITATION LIST

Patent Literature

Patent Literature 1: Unexamined Japanese Patent Application Kokai Publication No. 2007-287131.

SUMMARY OF INVENTION

Technical Problem

In the above service, reactions of other users are updated immediately or periodically while the user is utilizing the service. Furthermore, the user is notified that there are reactions from other users immediately or periodically, or collectively through email as a bundle of a given number of reactions. However, the user may be annoyed by unnecessary notice or excessively frequent notification.

The present invention solves the above problem and an objective of the present invention is to provide a provision device, provision method, program, and recording medium enabling proper provision of reactions of other users.

Solution to Problem

The provision device according to a first exemplary aspect of the present invention is a provision device in a provision system providing a user conducting activities through a service with reactions of other users to the user, comprising:

a presenter presenting a current state of the reactions from the other users to the user that have occurred while the user is conducting activities through the service to the user via the service while the user is conducting activities through the service; and a notifier giving notice of a summary of the reactions from the other users to the user that have occurred while the user is not conducting activities through the service to the user with no intervention of the service while the user is not conducting activities through the service, wherein as the user conducts a given operation on information contained in the notified summary, the notifier prompts the user to start conducting activities through the service.

In the above provision device, the notifier adjusts a frequency of notification from the notifier and a number of reactions of the other users contained in the summary so as to increase a rate of the user conducting the given operation on information contained in the notice and a length of time during which the user conducts activities through the service.

The provision method according to a second exemplary aspect of the present invention is a provision method in a provision system providing a user conducting activities through a service with reactions of other users to the user, comprising:

a presentation step for presenting a current state of the reactions from the other users to the user that have occurred while the user is conducting activities through the service to the user via the service while the user is conducting activities through the service; and a notification step for giving notice of a summary of the reactions from the other users to the user that have occurred while the user is not conducting activities through the service to the user with no intervention of the service while the user is not conducting activities through the service, wherein in the notification step, as the user conducts a given operation on information contained in the notified summary, the user is prompted to start conducting activities through the service.

The program according to a third exemplary aspect of the present invention is a program that allows a computer to function as the following in a provision system providing a user conducting activities through a service with reactions of other users to the user:

a presenter presenting a current state of the reactions from the other users to the user that have occurred while the user is conducting activities through the service to the user via the service while the user is conducting activities through the service; and a notifier giving notice of a summary of the reactions from the other users to the user that have occurred while the user is not conducting activities through the service to the user with no intervention of the service while the user is not conducting activities through the service, wherein as the user conducts a given operation on information contained in the notified summary, the notifier prompts the user to start conducting activities through the service.

The computer-readable recording medium according to a fourth exemplary aspect of the present invention is a computer-readable recording medium on which programs are recorded that allow a computer to function as the flowing in a provision system providing a user conducting activities through a service with reactions of other users to the user:

a presenter presenting a current state of the reactions from the other users to the user that have occurred while the user is conducting activities through the service to the user via the service while the user is conducting activities through the service; and a notifier giving notice of a summary of the reactions from the other users to the user that have occurred while the user is not conducting activities through the service to the user with no intervention of the service while the user is not conducting activities through the service, wherein as the user conducts a given operation on information contained in the notified summary, the notifier prompts the user to start conducting activities through the service.

The above recording medium can be a non-transitory recording medium and distributed/sold independently from a computer. Here, a non-transitory recording medium means a tangible recording medium. The non-transitory recording medium can be, for example, a compact disc, flexible disc, hard disc, magnetooptical disc, digital video disc, magnetic tape, semiconductor memory, or the like. On the other hand, a transitory recording medium means a transfer medium (propagating signal) itself. The transitory recording medium can be, for example, electric signals, optical signals, electromagnetic waves, or the like. Incidentally, a temporary memory region is a region for temporarily storing data and/or programs and, for example, a volatile memory such as a RAM (random access memory).

Advantageous Effects of Invention

The present invention can provide a provision device, provision method, program, and recording medium enabling proper provision of reactions of other users.

DESCRIPTION OF EMBODIMENTS

Embodiments of the present invention will be described hereafter. The following embodiments are given for the purpose of explanation and do not confine the scope of the invention of the present application. Thus, a person of ordinary skill in the field may embrace an embodiment in which some or all components are replaced with equivalent counterparts and such an embodiment falls under the scope of the present invention.

(1. Overall Configuration)

Figure 1:
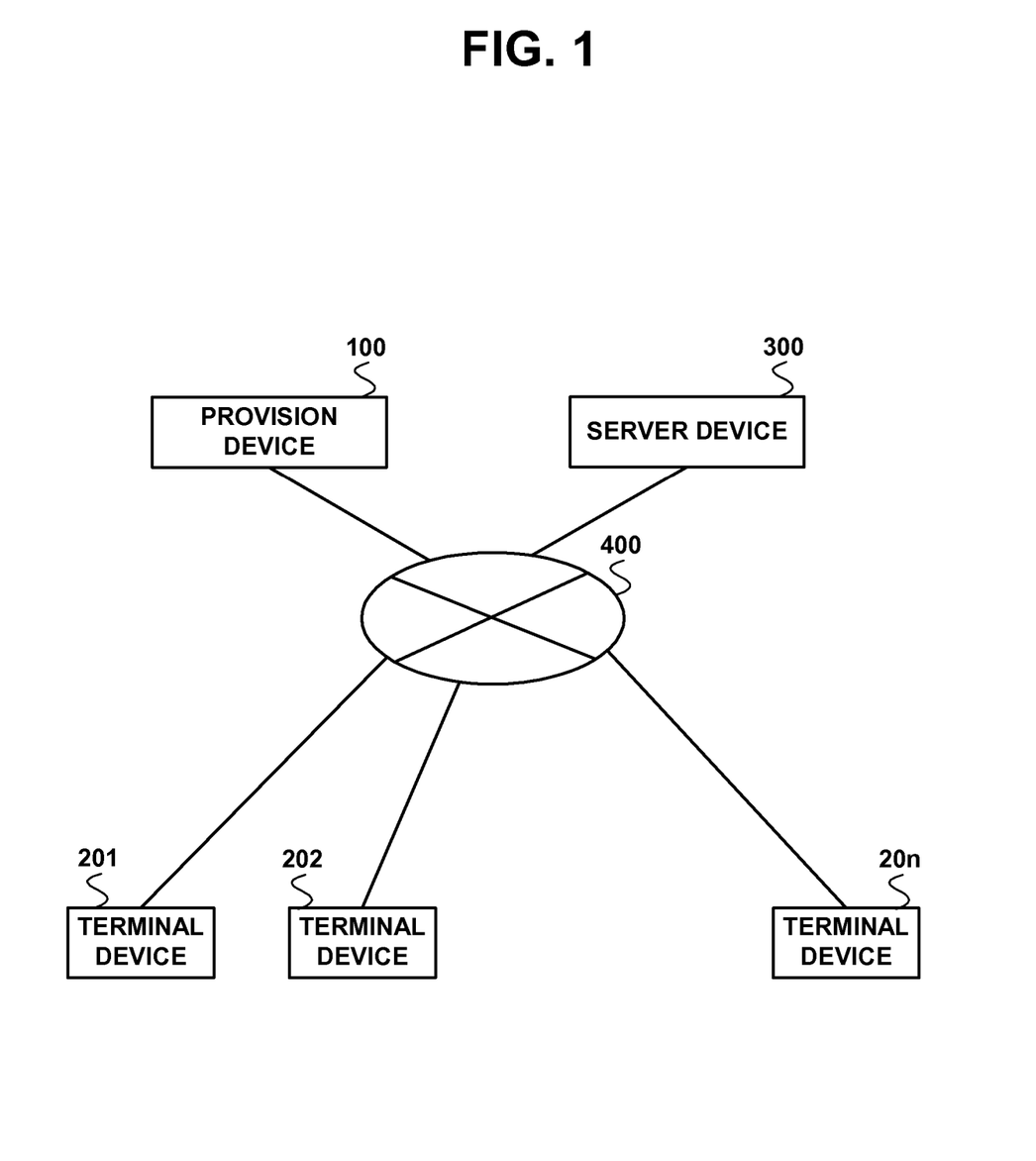
FIG. 1 is an illustration showing the relationship among the provision device according to embodiments of the present invention, a server device, and terminal devices.

A provision device 100 according to the embodiments of the present invention is connected to the Internet 400 as shown in FIG. 1. Furthermore, multiple terminal devices 201, 202, ..., and 20n (which are connectively referred to as the terminal devices 200 hereafter) and a server device 300 are connected to the Internet 400. The terminal devices 200 are used by users utilizing the service provided by the server device 300. The server device 300 provides various services to the terminal devices 200 connected via the Internet 400. The services provided by the server device 300 include, for example, a social networking service.

In FIG. 1, the provision device 100 is connected to the server device 300 via the Internet 400. However, the provision device 100 can be connected to the server device 300 directly. Alternatively, the provision device 100 can be realized by the server device 300.

Figure 2:
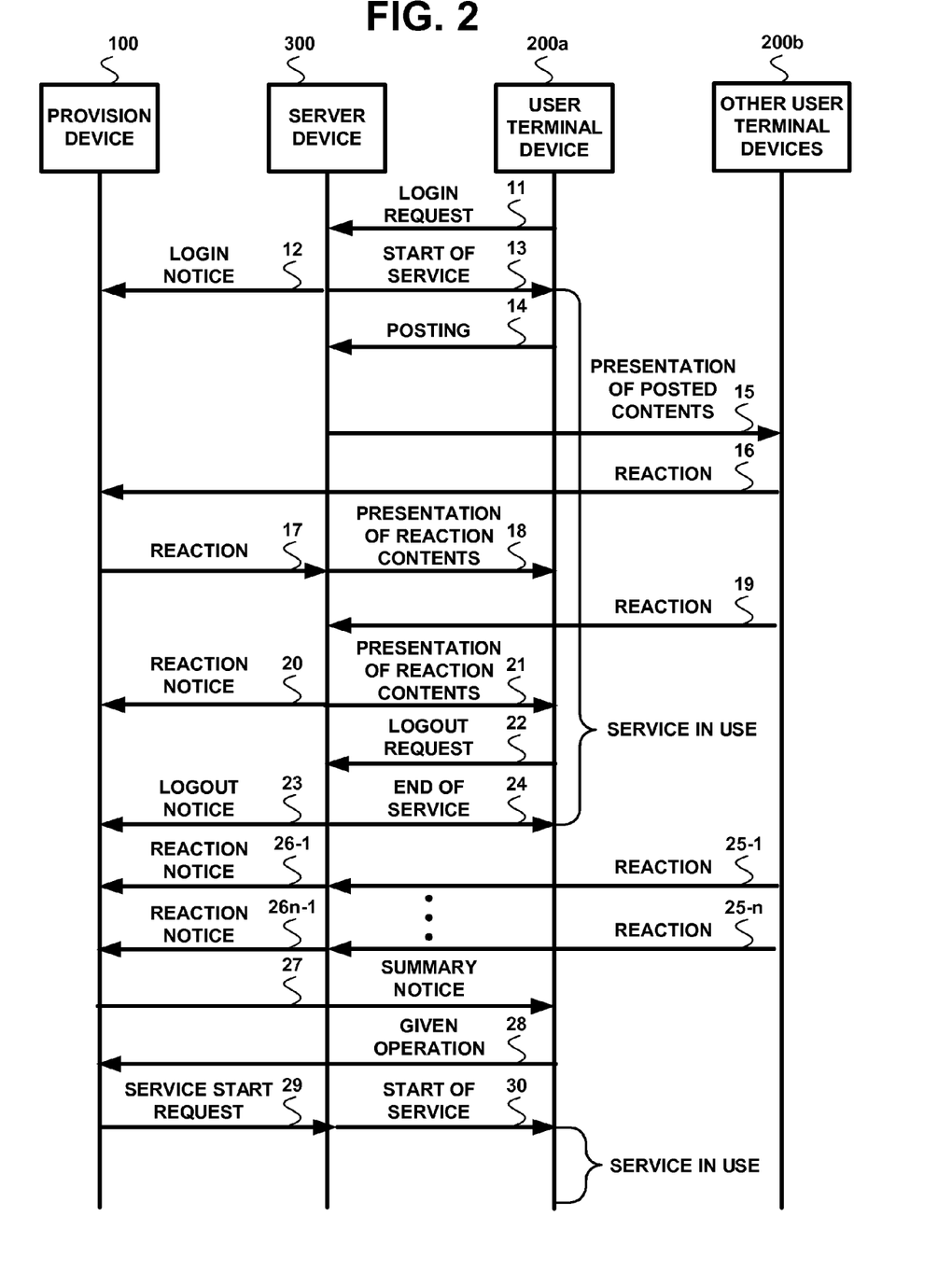
FIG. 2 is a chart showing exemplary communication among the provision device, the server device, a user terminal device, and other user terminal devices.

Communication among the provision device 100, terminal devices 200, and server device 300 will be described hereafter with reference to FIG. 2 on the assumption that the server device 300 provides a social networking service. As for the terminal devices 200, two kinds of terminal devices, a terminal device used by a user ("a user terminal device 200a," hereafter) and terminal devices used by other users excluding the user ("other user terminal devices 200b," hereafter), will be described distinctively.

The user terminal device 200a sends a login request for utilizing the service (11).

After the received login request is successfully authenticated, the server device 300 notifies the provision device 100 that the user has logged in (12) and starts providing the service to the user terminal device 200a (13). Then, the user of the user terminal device 200a starts utilizing the service provided by the server device 300.

The user terminal device 200a posts diaries and/or pictures on the server device 300 (14).

The server device 300 presents the contents posted by the user terminal device 200a to the other user terminal devices 200b to which the user of the user terminal device 200a has given permission of the presentation (15).

The other user terminal devices 200b send their reactions to the posted contents, such as comments, to the provision device 100 (16).

Receiving the reactions from the other user terminal devices 200b, the provision device 100 sends the reactions to the server device 300 (17).

Then, receiving the reactions, the server device 300 presents the contents of the reactions to the user terminal device 200a (18).

Alternatively, the other user terminal devices 200b send their reactions to the posted contents, such as comments, to the server device 300 (19).

Receiving the reactions from the other user terminal devices 200b, the server device 300 notifies the provision device 100 of the reactions (20).

Furthermore, receiving the reactions from the other user terminal devices 200b, the server device 300 presents the contents of the reactions to the user terminal device 200a (21).

The user terminal device 200a sends a logout request for ending the service (22).

The server device 300 stores information regarding the operation conducted by the user terminal device 200a while the service is utilized, notifies the provision device 100 that the user has logged out (23), and notifies the user terminal device 200a that the service is ended (24).

The other user terminal devices 200b send their reactions to the contents posted by the user terminal device 200a to the server device 300 even while the user terminal device 200a is not utilizing the service (25 to 25*n*). Here, the reactions can be sent to the provision device 100 directly.

Receiving the reactions from the other user terminal devices 200*b*, the server device 300 notifies the provision device 100 of the reactions (26 to 26*n*).

If the notified reactions satisfy a given condition, the provision device 100 notifies the user terminal device 200*a* of a summary of the received reactions (27).

Notified of the summary, the user terminal device 200*a* sends to the provision device 100 information regarding a given operation conducted by the user on information contained in the summary (28).

Receiving the information regarding the given operation from the user terminal device 200*a*, the provision device 100 notifies the server device 300 of a service start request (29).

Receiving the service start request from the provision device 100, the server device 300 starts providing the service to the user terminal device 200*a* (30). Then, the user of the user terminal device 200*a* starts utilizing the service provided by the server device 300.

(2. General Configuration of Information Processing Device)

Figure 3:
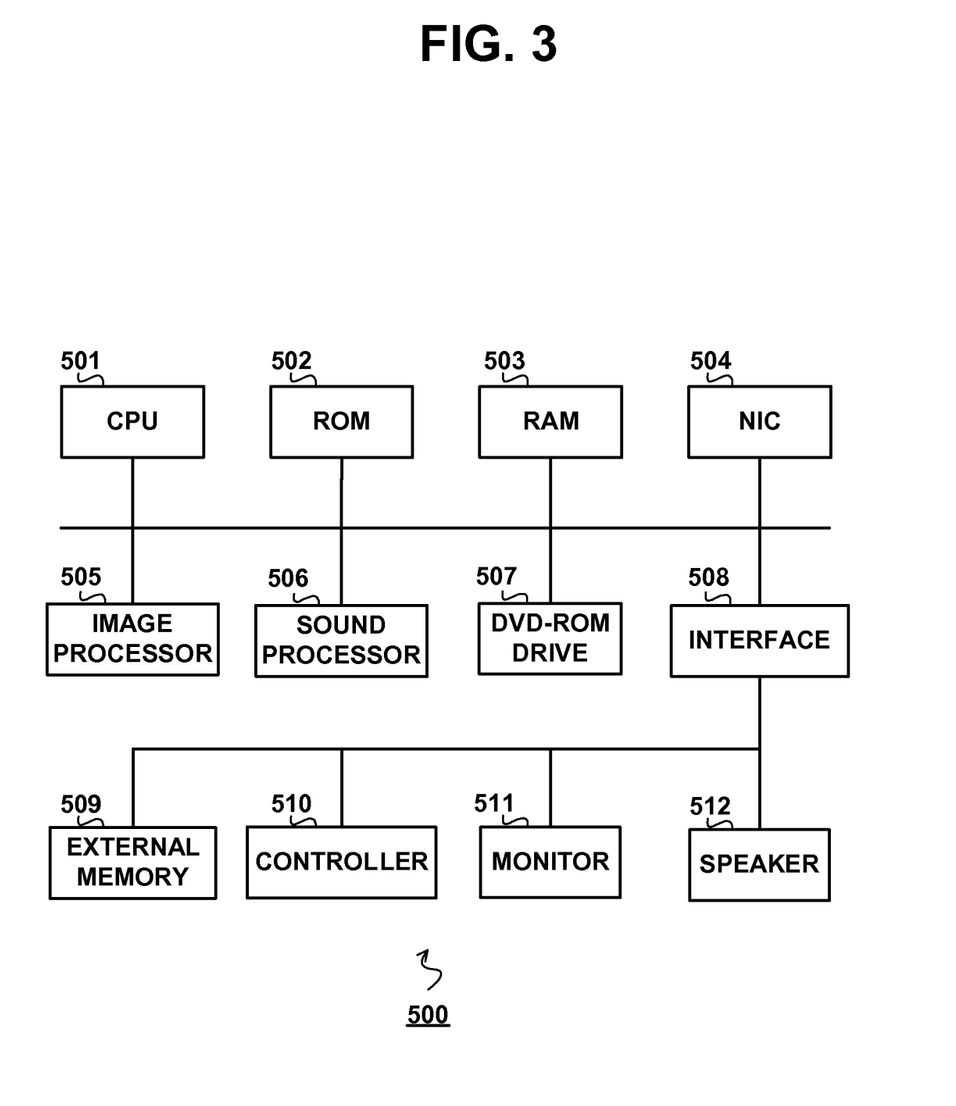
FIG. 3 is a diagram showing the general configuration of a typical information processing device realizing the provision device according to embodiments of the present invention.

A typical information processing device 500 realizing the provision device 100 according to the embodiments of the present invention will be described hereafter.

The information processing device 500 comprises, as shown in FIG. 3, a CPU (central processing unit) 501, a ROM (read only memory) 502, a RAM 503, a NIC (network interface card) 504, an image processor 505, a sound processor 506, a DVD-ROM (digital versatile disc ROM) drive 507, an interface 508, an external memory 509, a controller 510, a monitor 511, and a speaker 512.

The CPU 501 controls the entire operation of the information processing device 500. Connected to the components, the CPU 501 exchanges control signals and data with the components.

The ROM 502 records an IPL (initial program loader) executed immediately after power-on. As the IPL is executed, given programs are read onto the RAM 503 and the CPU 501 starts executing the programs. The ROM 502 further records operating system programs and various data necessary for the entire operation control of the information processing device 500.

The RAM 503 is used to temporarily store data and programs, retaining programs and data read from DVD-ROMs and, additionally, data necessary for communication and the like.

The NIC 504 is used to connect the information processing device 500 to a computer communication network such as the Internet. The NIC 504 has an interface (not illustrated in the figure) for acting as a go-between for devices such as a device according to the 10 BASE-T/100 BASE-T standard that is used when creating a LAN (Local Area Network), an analog modem, an ISDN (Integrated Services Digital Network) modem, an ADSL (Asymmetric Digital Subscriber Line) modem for connecting to the Internet using an telephone line, a cable modem for connecting to the Internet using a cable television line, and the like, and the CPU 501.

The image processor 505 processes data read from a DVD-ROM or the like by means of the CPU 501 or an image computing processor (not shown) of the image processor 505 and records the processed data in a frame memory (not shown) of the image processor 505. The image information recorded in a frame memory is converted to video signals at given synchronized times and output to the monitor 511. Then, various pages can be displayed.

The sound processor 506 converts sound data read from a DVD-ROM or the like to analog sound signals and outputs the analog sound signals from the speaker 512 connected to the sound processor 506. Furthermore, the sound processor 506 generates sound to produce in the course of processing by the information processing device 500 and outputs the corresponding sound from the speaker 512 under the control of the CPU 501.

The DVD-ROM mounted on the DVD-ROM drive 507 stores, for example, programs for realizing the provision device 100 according to the embodiments. Under the control of the CPU 501, the DVD-ROM drive 507 reads the DVD-ROM mounted thereon and reads out necessary programs and/or data, and the programs and/or data are temporarily stored on the RAM 503.

The external memory 509, controller 510, monitor 511, and speaker 512 are detachably connected to the interface 508.

The external memory 509 stores data regarding user personal information and the like in a rewritable manner.

The controller 510 receives input of operation conducted for various kinds of setting of the information processing device 500. The user of the information processing device 500 can enter commands via the controller 510 to record the data on the external memory 509 as appropriate.

The monitor 511 presents data output from the image processor 505 to the user of the information processing device 500.

The speaker 512 presents sound data output from the sound processor 506 to the user of the information processing device 500.

Additionally, the information processing device 500 can be configured to exert the functions of the ROM 502, RAM 503, external memory 509, and DVD-ROMs mounted on the DVD-ROM drive 507 using a large capacity external storage such as a hard disc.

The provision device 100 realized by the above-described information processing device 500 will be described hereafter with reference to FIGS. 1 to 10. As the information processing device 500 is powered on, programs for functioning as the provision device 100 according to the embodiments are executed and the provision device 100 according to the embodiments is realized.

(3. General Configuration of the Provision Device of Embodiment 1)

The provision device 100 of Embodiment 1 properly provides the user with the reactions that have occurred while the user is not utilizing the service.

Figure 4:
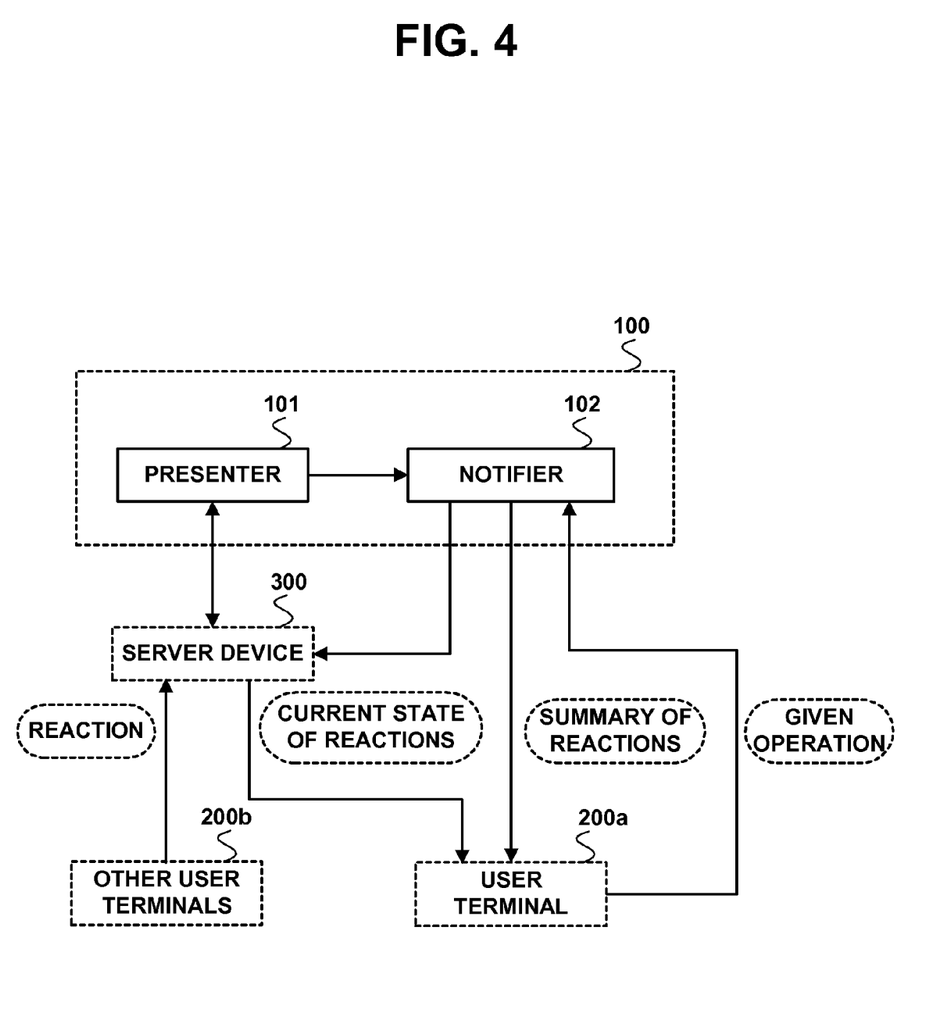
FIG. 4 is a diagram showing the general configuration of the provision device according to Embodiment 1.

The provision device 100 of Embodiment 1 comprises, as shown in FIG. 4, a presenter 101 and a notifier 102 and is configured as follows.

The provision device 100 is applied to a provision system providing a user conducting activities through the service with reactions of other users to the user. Here, the provision system is, for example, a system including the terminal devices 200 and server device 300. Furthermore, the service is, for example, a social networking service.

For example, the expression "a user conducts activities through the service" means that the user posts diaries and/or pictures, releases them to other users, or views the contents posted by other users through a social networking service. Furthermore, the reactions of other users mean comments and/or evaluation on the posted diaries and/or pictures. Then, the provision system provides the user who has posted diaries and/or pictures through the service with the reactions of other users to the posted contents.

The presenter 101 presents the current state of reactions from users to the user that have occurred while the user is conducting activities through the service to the user via the service while the user is conducting activities through the service.

The expression "while the user is conducting activities" means, for example, the period since the user logs into the social networking service and until the user logs out from the social networking service.

"The current state of reactions" refers to, for example, the contents of the reactions themselves or information including the users who have sent the reactions and the snippets/summaries/types of the reactions.

For example, it is assumed that a user "a" logs into a social networking service via a browser and posts diaries. Then, the user "a" views various sites while he remains logged in the social networking service.

Figure 5:
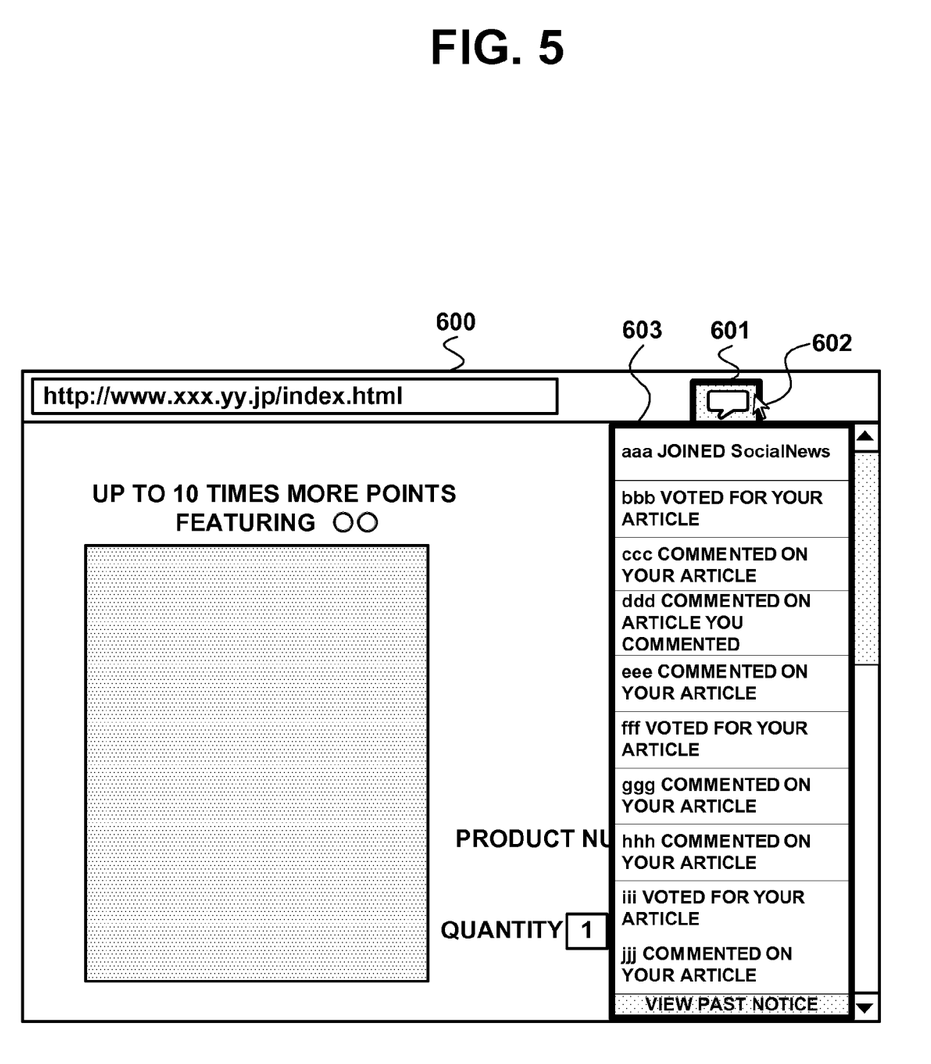
FIG. 5 is an illustration for explaining presentation of a current state of reactions.

FIG. 5 shows exemplary presentation of the current state of reactions to the user "a". The user "a" is viewing a site via a browser 600. Here, if the user "a" selects an icon 601 with a cursor 602, reactions, such as comments, of other users to the diaries posted by the user "a" earlier are presented in a window 603 ("a reaction summary window," hereafter).

The reaction summary window presents that the reactions from the other users occurred in real time or at given time intervals (for example, every 30 seconds). The presenter 101 checks whether there are new reactions in real time or at given time intervals. If there are new reactions, the presenter 101 updates the display in the reaction summary window.

The notifier 102 gives notice of a summary of the reactions from other users to the user that have occurred while the user is not conducting activities through the service to the user with no intervention of the service while the user is not conducting activities through the service.

For example, the reactions from other users to the contents posted by the user may occur even after the user logs out and stops utilizing the social networking service. The notifier 102 sends the summary of the reactions that have occurred after the user stopped utilizing the service, for example, to a portable terminal used by the user via email.

The summary of reactions is, for example, a collection of reactions that have occurred. More specifically, the summary of reactions includes the contents giving notice of reactions, the reactions themselves, or an URL (uniform resource locator) specifying the site displaying the snippets of the reactions.

Figure 6:
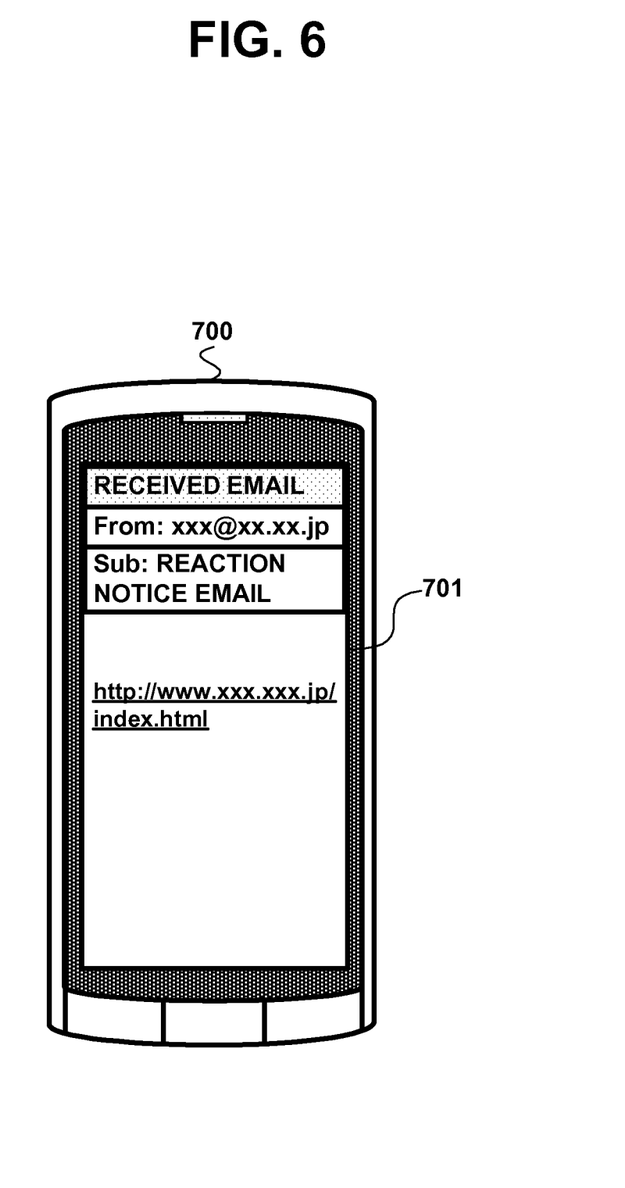
FIG. 6 is an illustration for explaining notice of a summary of reactions.

FIG. 6 shows an exemplary email sent to the user. An email is sent to a portable terminal 700 used by the user "a" after the user "a" logs out. As the email is opened with some email software, the URL is displayed on a screen 701.

Here, the time for the notifier 102 to give notice of the summary of reactions will be described hereafter.

Figure 7:
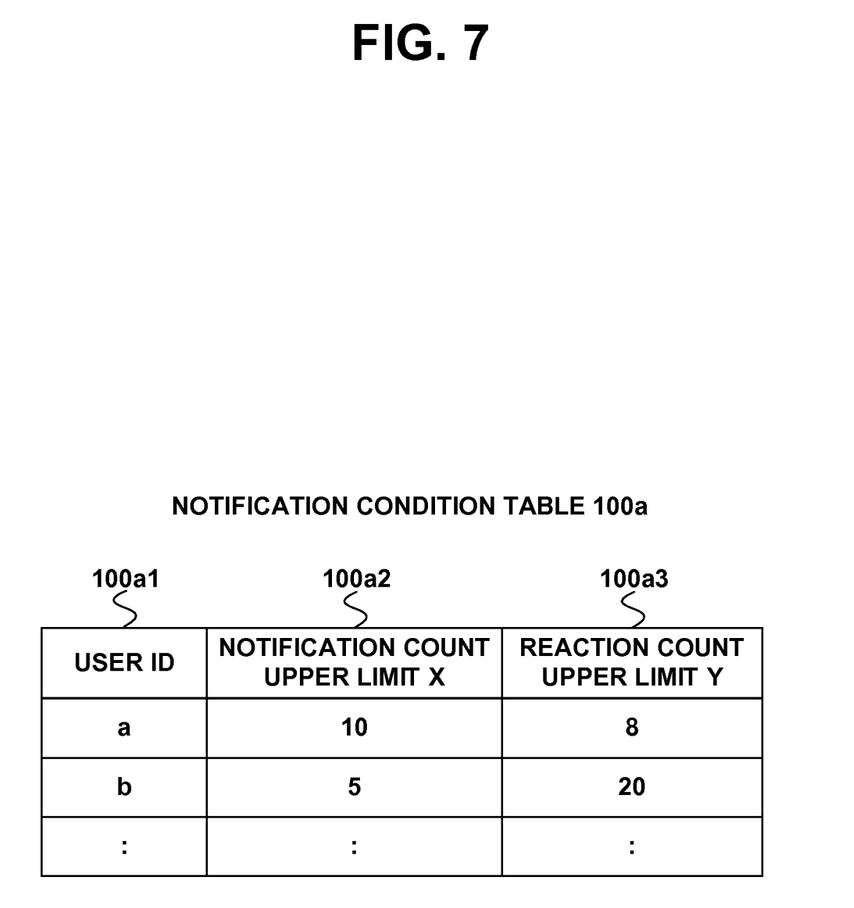
FIG. 7 is an illustration for explaining a notification condition table.

FIG. 7 shows a notification condition table 100a. The notification condition table 100a associates and records a user ID 100a1, a notification count upper limit X 100a2, and a reaction count upper limit Y 100a3.

The notification count upper limit X is the upper limit of the number of times per unit time (for example, one day) of notification of the summary. For example, the notification count upper limit X is the upper limit of the number of times per day of email notification. In other words, as the notification count upper limit X is lower, notification is conducted less frequently and the user is not annoyed.

The reaction count upper limit Y is the upper limit of the number of reactions reported in one notice. For example, the reaction count upper limit Y is the number of reactions notified collectively in an email. As the reaction count upper limit Y is greater, a larger number of reactions are included in a notice; then, email is not frequently sent and the user is not annoyed.

If the reaction summary notification count has not reached the notification count upper limit X, the notifier 102 gives notice of a summary of reactions when the number of reactions that have occurred while the user is not utilizing the services has reached the reaction count upper limit Y. After the summary notification count per unit time has reached the upper limit, the notifier 102 does not give notice of the summary even if the number of reactions that have occurred while the user is not utilizing the service has reached the reaction count upper limit Y.

For example, in the notification condition table 100a of FIG. 7, the notification count upper limit X and reaction count upper limit Y of the user "a" (the user ID "a") are 10 and 8, respectively. This means that up to ten notices of the summary are given in one day and one notice is given each time eight reactions have occurred while the user "a" is not utilizing the services.

The user can set the notification count upper limit X and reaction count upper limit Y as appropriate.

Then, as the user conducts a given operation on information contained in the notified summary, the notifier 102 allows the user to start conducting activities through the service.

Figure 8:
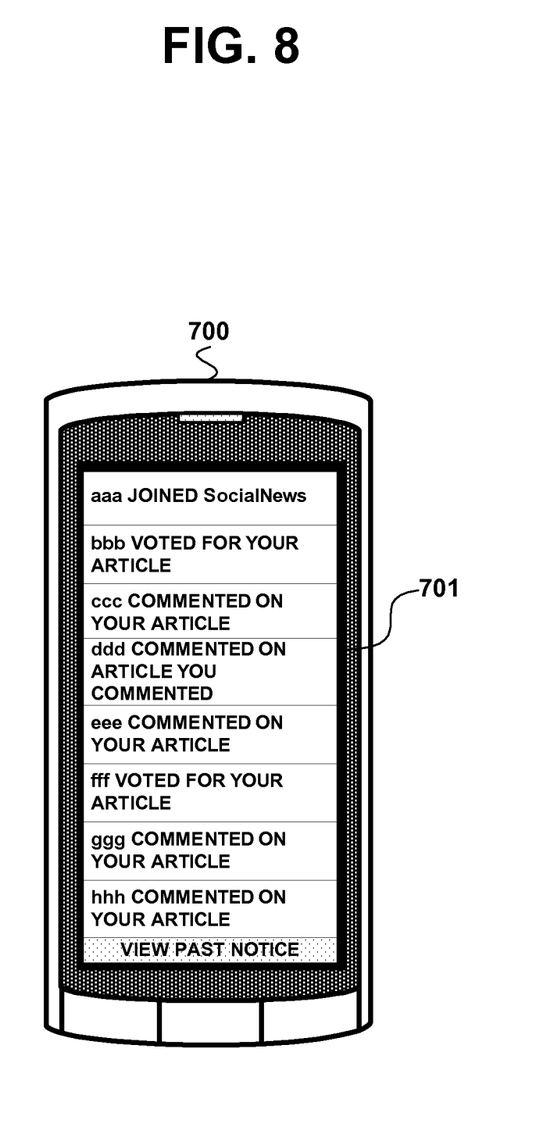
FIG. 8 is an illustration for explaining a screen displayed after a given operation.

For example, as the user conducts a selection operation such as tapping on a URL contained in the noticed email, a screen 701 containing the reactions that have occurred after logout are displayed as shown in FIG. 8.

With this embodiment, the user is notified of only the reactions that have occurred while the user is not utilizing the service with no intervention of the service; thus, the user does not receive unnecessary notice while he is utilizing the service. Furthermore, with the frequency of notification and number of reactions notified being set, the user can receive the summary as the user desires in frequency and/or in quantity. Furthermore, even in the case of so-called inflaming, an event of comments and/or track back pouring in much more than the administrator expected, excessive notification can be prevented.

(4. Provision procedure executed by the provision device of Embodiment 1)

Operation of the provision device 100 of Embodiment 1 will be described hereafter. As the information processing device 500 realizing the provision device 100 is powered on, the CPU 501 starts the procedure shown in FIG. 9.

Figure 9:
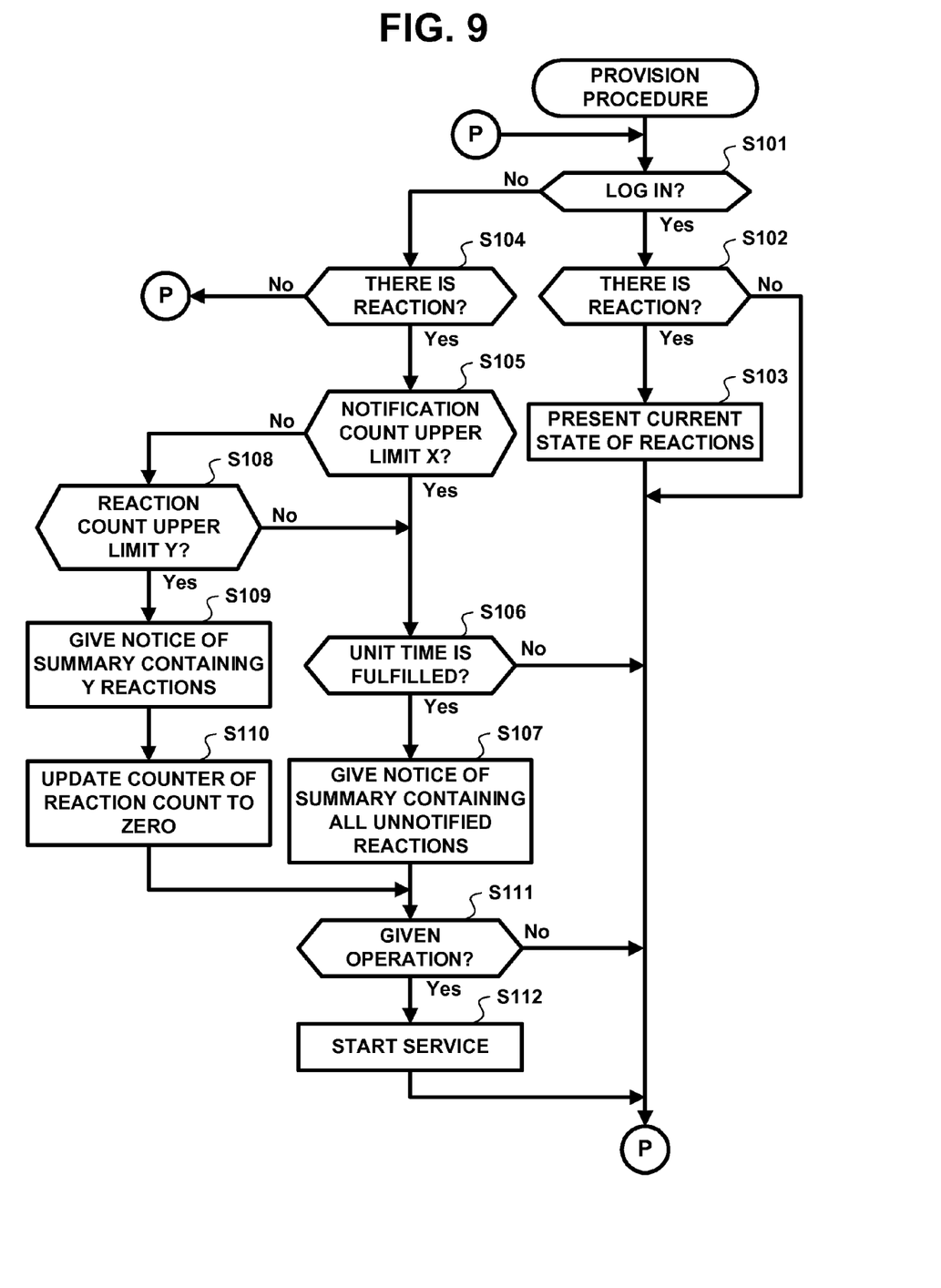
FIG. 9 is a flowchart for explaining a provision procedure executed by the provision device according to Embodiment 1.

The presenter 101 determines whether the user has logged in (Step S101). If the presenter 101 determines that the user has logged in (Step S101; Yes), the presenter 101 determines whether there is reaction from other users (Step S102). On the other hand, if the presenter 101 determines that the user has not logged in (Step S101; No), the notifier 102 determines whether there is reaction from other users (Step S104).

For example, if the server device 300 notifies the provision device 100 that the user "a" has logged in, the presenter 101 determines that the user "a" has logged in. Then, the presenter 101 determines whether there is reaction of other users to the user "a". On the other hand, if the provision device 100 is not notified that the user "a" has logged in, the presenter 101 determines that the user "a" has not logged in. Then, the presenter 101 determines whether there is reaction of other users to the user "a".

If the presenter 101 determines that there is reaction from other users in the Step S102 (Step S102; Yes), the presenter 101 presents the current state of the reactions to the user via the service (Step S103). Then, the procedure returns to the Step S101. On the other hand, if the presenter 101 determines that there is no reaction from other users in the Step S102 (Step S102; Yes), the procedure returns to the Step S101.

For example, if some other users send their reactions to the user "a" to the provision device 100, the presenter 101 determines that there is reaction from other users. Then, the presenter 101 sends the reactions to the server device 300 and presents the current state of the reactions to the user "a" via the service conducted by the server device 300. Alternatively, it is possible that some other users send their reactions to the user "a" to the server device 300 and the server device 300 sends that the notification of reactions were sent to the presenter 101. Then, the server device 300 automatically presents to the user "a" the reactions. On the other hand, if no reaction is sent from other users to the provision device 100, the presenter 101 determines that there is no reaction from other users.

If the notifier 102 determines that there is reaction from other users in the Step S104 (Step S104; Yes), the notifier 102 determines whether the current reaction summary notification count is equal to or lower than the notification count upper limit X (Step S105). On the other hand, if the notifier 102 determines that there is no reaction from other users in the Step S104 (Step S104; No), the procedure returns to the Step S101.

For example, if the server device 300 notifies the provision device 100 that there is reactions to the user "a" after the user "a" has logged out, the notifier 102 determines whether the current reaction summary email notification count has reached the notification count upper limit X. On the other hand, if the server device 300 does not notify the provision device 100 that there is reaction to the user "a", the notifier 102 determines that there is no reaction of other users and the procedure returns to the Step S101.

If the notifier 102 determines that the summary notification count has reached the notification count upper limit X in the Step S105 (Step S105; Yes), the notifier 102 determines whether the current time fulfills a unit time (Step S106). On the other hand, if the notifier 102 determines that the summary notification count is lower than the notification count upper limit X in the Step S105 (Step S105; No), the notifier 102 determines whether the number of notified reactions has reached the reaction count upper limit Y (Step S108).

For example, if the notification count upper limit is set to "10" and the summary email notification count is "10," the notifier 102 determines that the summary notification count has reached the notification count upper limit X. Then, the notifier 102 determines whether the current time fulfills the unit time (for example, one day). On the other hand, if the summary email notification count is "5," the notifier 102 determines that the summary notification count has not reached the notification count upper limit X. Then, the notifier 102 determines whether the current number of notified reactions has reached the reaction count upper limit Y.

If the notifier 102 determines that the current time fulfills the unit time in the Step S106 (Step 106; Yes), the notifier 102 notifies the user of a summary containing all unnotified reactions (Step S107). On the other hand, if the notifier 102 determines that the current time does not fulfill the unit time in the Step S106 (Step S106; No), the procedure returns to the Step S101.

For example, if the unit time is set to "one day" and the notifier 102 determines that the current time fulfills the unit time "one day," the notifier 102 notifies the user "a" of a summary containing all unnotified reactions via email . On the other hand, if the notifier 102 determines that the current time does not fulfill the unit time "one day," the procedure returns to the Step S101.

If the notifier 102 determines that the current number of notified reactions has reached the reaction count upper limit Y in the Step S108 (Step S108; Yes), the notifier 102 notifies the user of a summary containing the Y reactions (Step S109). Then, the notifier 102 updates the reaction counter to zero (Step S110). On the other hand, if the notifier 102 determines that the current number of notified reactions has not reached the reaction count upper limit Y (Step S108; No), the procedure proceeds to the Step S106.

For example, if the reaction count upper limit Y is set to "8" and the current number of received reactions is eight, the notifier 102 determines that the current number of received reactions has reached the reaction count upper limit Y. Then, the notifier 102 notifies the user of a summary of the eight reactions. Furthermore, the notifier 102 updates the counter for counting the current number of notified reactions to zero. On the other hand, if the current number of notified reactions is "5," the notifier 102 determines that the current number of received reactions has not reached the reaction count upper limit Y. Then, the procedure proceeds to the Step S106 and the above processing is repeated.

After the Step S107 or Step S110, the notifier 102 determines whether the user has conducted a given operation on information contained in the notified summary (Step S111). If the notifier 102 determines that the user has conducted the given operation (Step S111; Yes), the notifier 102 allows the user to start utilizing the service (Step S112). On the other hand, if the notifier 102 determines that the user has conducted no given operation (Step S111; No), the procedure returns to the Step S101.

For example, if the user "a" taps on a URL contained in the noticed email, the notifier 102 allows the server device 300 to start providing the service to the user "a", and the screen 701 containing information regarding eight reactions that have occurred after logout is displayed as shown in FIG. 8. On the other hand, if the user "a" conducts no operation on the URL contained in the noticed email, the procedure returns to the Step S101.

Incidentally, the order of steps is not limited to the case in FIG. 9. For example, it is possible to first determine whether the current number of notified reactions has reached the reaction count upper limit Y and if it has reached, then determine whether the notification count upper limit X is achieved.

(5. General configuration of the provision device of Embodiment 2)

The provision device 100 of Embodiment 2 properly sets the frequency of notification and the number of reactions of other users contained in a summary based on the user's action.

The provision device 100 of Embodiment 2 comprises, as shown in FIG. 4, a presenter 101 and a notifier 102. The presenter 101 of Embodiment 2 has the same function as that of Embodiment 1. The notifier 102, which has a different function, will be described hereafter.

The notifier 102 gives notice of a summary of the reactions from other users to the user that have occurred while the user is not conducting activities through the service to the user with no intervention of the service while the user is not conducting activities through the service. In doing so, the notifier 102 adjusts the frequency of notification from the notifier 102 and the number of reactions of other users contained in the summary so as to increase the rate of the user conducting a given operation on information contained in the notice and the length of time during which the user conducts activities through the service.

The given operation the user conducts on information contained in the notice is, for example, tapping on a URL contained in the noticed email. The rate is, for example, the ratio of "the number of times of the user tapping on a URL contained in an email" to "the total number of noticed emails per unit time (one day)."

The length of time during which the user conducts activities through the service is "the time during which the user is logged in the service" or "the time during which the focus is on the service on the screen."

If the user taps on a URL in the noticed email, presumably, the notice is useful for the user. In other words, the notice can be useful and not annoying for the user if the frequency of notification and the number of reactions of other users contained in the summary are obtained based on the above-mentioned rate and length of time. Furthermore, the service provider can encourage the users to utilize the service more.

The rate of the user conducting a given operation on information contained in the notice is referred to as "the rate A" and the length of time during which the user conducts activities through the service is referred to as "the time length B" hereafter.

The notification count upper limit X and reaction count upper limit Y are obtained based on the rate A and time length B and updated as appropriate.

More specifically, an evaluation value based on the rate A and time length B is calculated by an evaluation function e (A, B). The simplest example is as follows.

$$e(A, B) = K \times A + H \times B \text{ ($K$ and $H$ are nonnegative constants)} \quad \text{(Math 1)}$$

The notification count upper limit X and reaction count upper limit Y are adjusted by maximum likelihood estimation to obtain X and Y maximizing the evaluation value.

In the simplest case, for example, the notification count upper limit X or reaction count upper limit Y is set to an appropriate initial value, the notification count upper limit X or reaction count upper limit Y is changed minimally and randomly, the change is held if the evaluation value is improved, and the change is cancelled if the evaluation value deteriorates.

Here, in the case of inflaming, the total number of reactions during logout, C, is divided by the notification count upper limit X and the obtained value is set as the reaction count upper limit Y.

If the notification count upper limit X falls below one, the unit time can be extended (for example, doubled).

This embodiment can give notice of the summary usefully for the user in frequency and quantity and adjust the notice in frequency and quantity so as to increase the length of time during which the user conducts activities through the service.

(6. Adjustment procedure executed by the provision device of Embodiment 2)

Operation of the provision device 100 of Embodiment 2 will be described hereafter. As the information processing device 500 realizing the provision device 100 is powered on, the CPU 501 starts the procedure shown in FIG. 9 and concurrently starts the procedure shown in FIG. 10.

Figure 10:
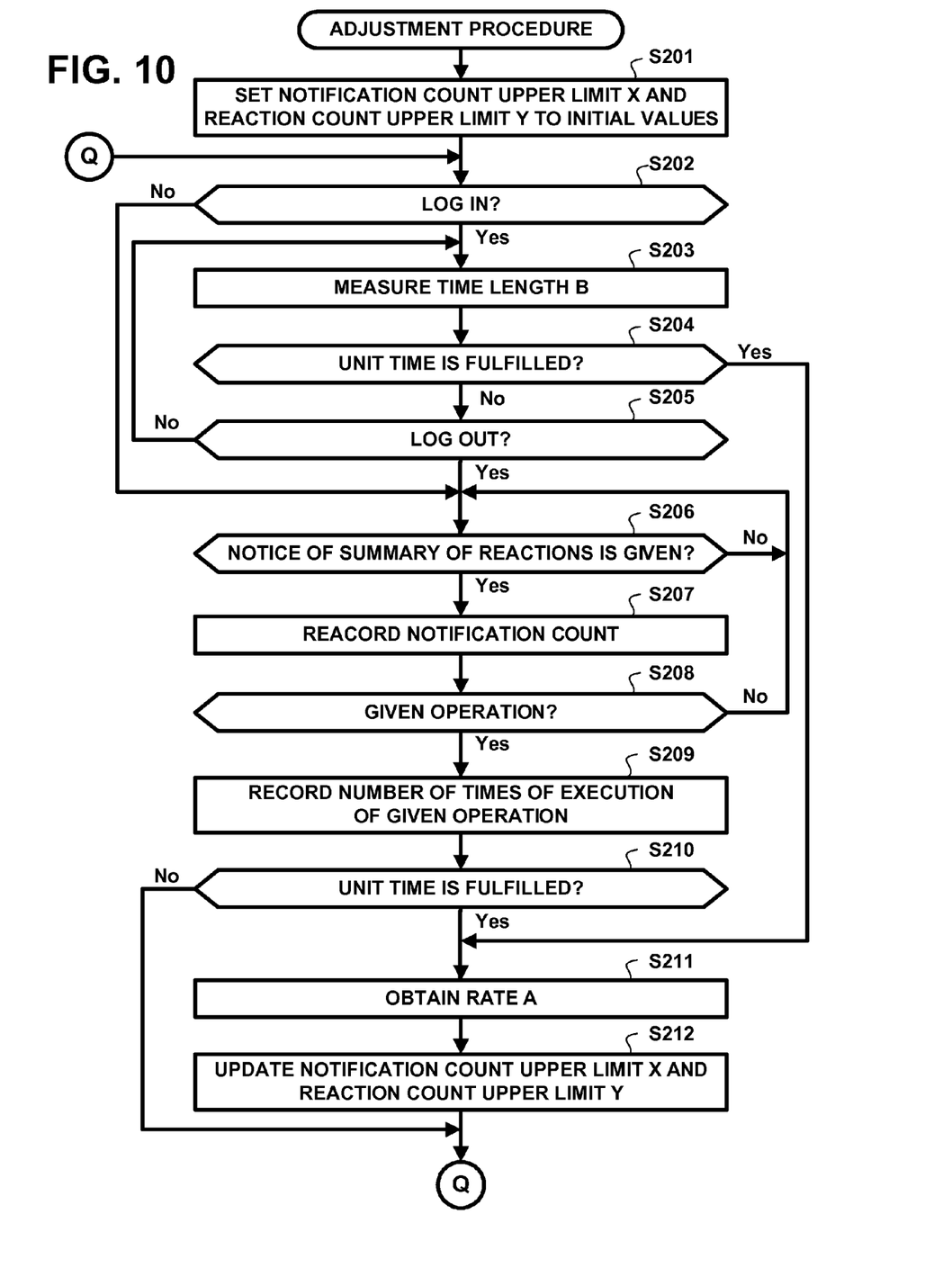
FIG. 10 is a flowchart for explaining an adjustment procedure executed by the provision device according to Embodiment 2.

The notifier 102 sets the notification count upper limit X and reaction count upper limit Y to initial values (Step S201).

For example, the notifier 102 uses values specified by the user as the initial values.

The notifier 102 determines whether the user has logged in (Step S202). If the user has logged in (Step S202; Yes), the notifier 102 starts measuring "the time length B" during which the user conducts activities through the service (Step S203). On the other hand, if the notifier 102 determines that the user has not logged in (Step S202; No), the notifier 102 determines whether a summary of reactions is notified (Step S206).

For example, if the server device 300 notifies the provision device 100 that the user "a" has logged in, the notifier 102 determines that the user "a" has logged in. Then, the notifier 102 starts measuring the time length B during which the user "a" is logged in. On the other hand, if the provision device 100 is notified of no login request from the user "a", the notifier 102 determines that the user "a" has not logged in. Then, the notifier 102 determines whether a summary of reactions is notified.

The notifier 102 determines whether the current time fulfills a unit time (Step S204). If the current time fulfills the unit time (Step S204; Yes), the procedure proceeds to Step S211. On the other hand, if the notifier 102 determines that the current time does not fulfill the unit time (Step S204; No), the notifier 102 determines whether the user has logged out (Step S205).

For example, if the current time fulfills a unit time (for example, one day), the procedure proceeds to Step S211. On the other hand, if the notifier 102 determines that the current time does not fulfill the unit time "one day," the notifier 102 determines whether the server device 300 has given notice of a logout request from the user "a".

If the notifier 102 determines that the user has logged out in the Step S205 (Step S205; Yes), the notifier 102 determines whether a summary of reactions is notified (Step S206). On the other hand, if the notifier 102 determines that the user has not logged out in the Step S205 (Step S205; No), the procedure returns to the Step S203 and continues to measure the time length B.

For example, if the server device 300 gives notice of the user "a" having logged out, the procedure determines that the user has logged out and determines whether a summary of reactions is notified. On the other hand, if the server device 300 gives no notice of the user "a" having logged out, the notifier 102 determines that the user has not logged out and continues to measure the time length B during which the user "a" is logged in.

If the summary of reactions is notified in the Step S206 (Step S06; Yes), the notifier 102 records the reaction summary notification count (Step S207). On the other hand, if the summary of reactions is not notified (Step S06; No), the notifier 102 waits as it is.

For example, if the notifier 102 gives a fifth email containing a summary to the user, the notifier 102 determines that a summary is notified and records the notification count of five. On the other hand, if the notifier 102 does not give notice of a summary of reactions, the notifier 102 waits as it is.

The notifier 102 determines whether the user has conducted a given operation on information contained in the notified summary (Step S208). If the user has conducted the given operation (Step S208; Yes), the notifier 102 records the number of times of execution of the given operation (Step S209). On the other hand, if the user has conducted no given operation (Step S208; No), the procedure returns to the Step S206.

For example, if the user a conducts a selection operation such as tapping on a URL contained in the noticed email, the notifier determines that the user has conducted a given operation. Then, if the given operation is conducted for the third time, the number of times is recorded. On the other hand, if no selection operation is conducted on the URL contained in the notice emailed to the user a, the procedure returns to the Step S206.

The notifier 102 determines whether the current time fulfills a unit time (Step S210). If the notifier 102 determines that the current time fulfills the unit time (Step S210; Yes), the notifier 102 obtains "the rate A" of the user conducting a given operation on information contained in the notice (Step S211). Then, the notifier 102 updates the notification count upper limit X and reaction count upper limit Y based on the obtained rate A and time length B (Step S212), and then the procedure returns to the Step S202. On the other hand, if the current time does not fulfill the unit time (Step S210; No), the procedure returns to the Step S202.

For example, if the current time fulfills a unit time (for example, one day), the notifier 102 obtains as the rate A the ratio of the number of times of execution of a given operation to the recorded notification count. Then, the notifier 102 obtains the notification count upper limit X and reaction count upper limit Y based on the rate A and time length B and updates them to the obtained values. On the other hand, if the current time does not fulfill a unit time (for example, one day), the procedure returns to the Step S202.

REFERENCE SIGNS LIST

100 Provision device
101 Presenter
102 Notifier
201, 202 to 20n, 200 Terminal device
200a User terminal device
200b Other user terminal devices
300 Server device
400 Internet
500 Information processing device
501 CPU
502 ROM
503 RAM
504 NIC
505 Image processor
506 Sound processor
507 DVD-ROM drive
508 Interface
509 External memory
510 Controller
511 Monitor
512 Speaker
600 Browser
601 Icon
602 Cursor
603 Window
700 Portable terminal
701 Screen

The invention claimed is:

1. A provision device in a provision system providing a user who conducts activities through a service with reactions of other users of the service to the user, comprising:
at least one memory operable to store program code;
at least one processor operable to read said program code and operate as instructed by said program code, said program code including;
presenter code configured to cause said at least one processor to present a current state of the reactions from the other users to the user that have occurred while the user conducts activities through the service to the user via the service while the user conducts activities through the service; and
notifier code configured to cause said at least one processor to give notice of a summary of the reactions from the other users to the user that have occurred while the user does not conduct activities through the service to the user with no intervention of the service while the user does not conduct activities through the service,
wherein as the user conducts a given operation on information contained in the summary, the notifier code is configured to cause said at least one processor to prompt the user to start to conduct activities through the service, and
wherein the notifier code is configured to cause said at least one processor to calculate a rate at which the user conducts the given operation on information contained in the notice and a length of time during which the user conducts activities through the service, change a frequency of notification from the notifier code and a number of reactions of the other users contained in the summary, hold the changes in the frequency of notification and the number of reactions when an evaluation value based on the rate and the time length is improved, and cancel the changes in the frequency of notification and the number of reactions when the evaluation value deteriorates.

2. A provision method executed by a computer provision system providing a user who conducts activities through a service with reactions of other users of the service to the user, comprising:
the computer provision system presenting a current state of the reactions from the other users to the user that have occurred while the user conducts activities through the service to the user via the service while the user conducts activities through the service; and
the computer provision system giving notice of a summary of the reactions from the other users to the user that have occurred while the user does not conduct activities through the service to the user with no intervention of the service while the user does not conduct activities through the service,
wherein, as the user conducts a given operation on information contained in the summary, the computer provision system prompts the user to start to conduct activities through the service, and
wherein the computer provision system calculates a rate at which the user conducts the given operation on information contained in the notice and a length of time during which the user conducts activities through the service, changes a frequency of giving notice and a number of reactions of the other users contained in the summary, holds the changes in the frequency of giving notice and the number of reactions when an evaluation value based on the rate and the time length is improved, and cancels the changes in the frequency of giving notice and the number of reactions when the evaluation value deteriorates.

3. A non-transitory computer-readable recording medium on which at least one program is recorded that allow a computer to function as the flowing in a provision system providing a user who conducts activities through a service with reactions of other users of the service to the user, said at least one program including:

presenter code causing said computer to present a current state of the reactions from the other users to the user that have occurred while the user conducts activities through the service to the user via the service while the user conducts activities through the service; and notifier code causing said computer to give notice of a summary of the reactions from the other users to the user that have occurred while the user does not conduct activities through the service to the user with no intervention of the service while the user does not conduct activities through the service, wherein as the user conducts a given operation on information contained in the summary, the notifier code causes said computer to prompt the user to start to conduct activities through the service, and wherein the notifier code causes said computer to calculate a rate at which the user conducts the given operation on information contained in the notice and a length of time during which the user conducts activities through the service, change a frequency of notification from the notifier code and a number of reactions of the other users contained in the summary, hold the changes in the frequency of notification and the number of reactions when an evaluation value based on the rate and the time length is improved, and cancel the changes in the frequency of notification and the number of reactions when the evaluation value deteriorates.

* * * * *